United States Patent [19]

Sugawara

[11] 4,232,840

[45] Nov. 11, 1980

[54] TAPE CASSETTE

[75] Inventor: Kokichi Sugawara, Miyagi, Japan

[73] Assignee: Sony Corporation, Tokyo, Japan

[21] Appl. No.: 34,762

[22] Filed: Apr. 30, 1979

[30] Foreign Application Priority Data

May 8, 1978 [JP] Japan .............................. 53-61346[U]

[51] Int. Cl.³ ............................................. G11B 23/10
[52] U.S. Cl. .................................................. 242/198
[58] Field of Search ...................... 242/198, 199, 71.2, 242/54.1

[56] References Cited

U.S. PATENT DOCUMENTS 2,584,733   2/1952   Owens ............................ 242/71.2 X 4,106,724   8/1978   Higashida ........................... 242/198

FOREIGN PATENT DOCUMENTS

946106  12/1948  France ..................................... 242/198

Primary Examiner—Harvey C. Hornsby
Attorney, Agent, or Firm—Lewis H. Eslinger; Alvin Sinderbrand

[57] ABSTRACT

In a tape cassette which includes a pair of rotatable reels and a pair of reel lock levers for preventing the reels from rotating at least in the tape unwinding direction, a single spring is provided to urge the pair of reel lock levers into locking engagement on the peripheries of the reels.

3 Claims, 6 Drawing Figures

TAPE CASSETTE

BACKGROUND OF THE INVENTION

1. Field of the Invention

This invention relates generally to tape cassettes suitable for use with a recording and/or reproducing apparatus such as a VTR (Video Tape Recorder) or a tape recorder, and more particularly is directed to a reel locking mechanism to prevent reel rotation in an unwinding direction.

2. Description of the Prior Art

In a tape cassette of the above described kind, such as one illustrated in U.S. Pat. No. 4,106,724, a pair of reel lock levers are arranged between reels. The reel lock levers are urged in opposite directions by a pair of torsion springs so as to engage with the toothed periphery of reel flanges provided on the takeup and supply reels. Thus, the reels are prevented from rotating in the tape unwinding direction, while they can be rotated in the tape winding direction.

However, in this type of tape cassette since two small torsion springs are used to lock the reels, assembly is made more difficult and additional support posts and spring stops must be provided. Thus, it is difficult to employ an automatic assembling operation for such a tape cassette making assembly of such a cassette more costly.

OBJECTS AND SUMMARY OF THE INVENTION

Accordingly, it is an object of this invention to provide a tape cassette having a reel lock capability which overcomes the above described defects of prior art tape cassettes.

Another object of this invention is to provide a tape cassette in which the number of parts is less than that in the prior art tape cassettes.

A further object of this invention is to provide a tape cassette for which the assembly operation is facilitated.

A still further object of this invention is to provide a tape cassette which is lower in its cost of manufacture.

In accordance with an aspect of this invention, a tape cassette is provided which includes a pair of rotatable reels, a pair of reel lock levers for preventing the reels from rotating at least in the tape unwinding direction, and a single spring for urging the pair of reel lock levers into locking engagement on the peripheries of the reels.

The above and other objects, features, and advantages of the present invention will be apparent from the following description which is to be read in conjunction with the accompanying drawings.

DETAILED DESCRIPTION OF THE PREFERRED EMBODIMENTS

Before proceeding with a detailed description of the particular embodiments of this invention, and for the purpose of providing a clear contrast between the present invention and the prior art, an example of a conventional tape cassette will be described with reference to FIGS. 1 and 2.

Figure 1:
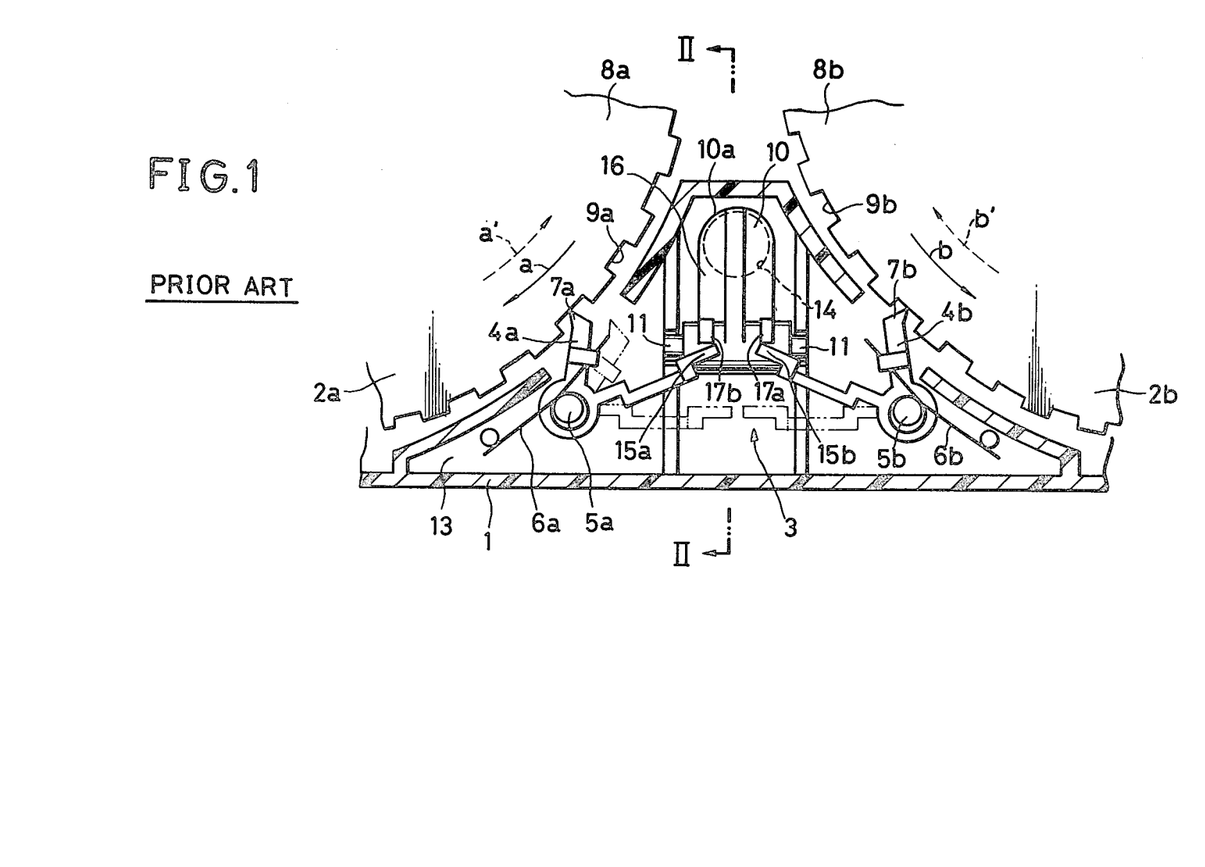
FIG. 1 is a partial sectional plan views of a conventional tape cassette showing details of a reel locking mechanism.
Figure 2:
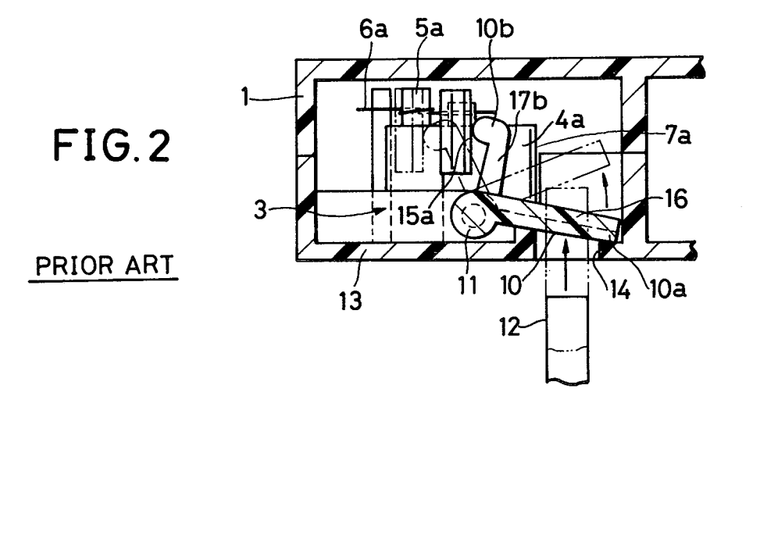
FIG. 2 is a cross-sectional view taken along line II—II of FIG. 1.

FIGS. 1 and 2 shown a typical prior art tape cassette of the reel-to-reel type, for example, of the type used for a cassette-type VTR (Video Tape Recorder) or a cassette-type tape recorder, in which a reel-lock system is employed. Such cassettes have a cassette housing 1 in which a pair of reels 2a and 2b are rotatably mounted. A substantially triangular area 3 is provided in cassette housing 1 between the outer peripheries of reels 2a and 2b. A pair of reel lock levers 4a and 4b are also provided and are rotatably mounted on support pins 5a and 5b, respectively.

Reel lock levers 4a and 4b are respectively urged to rotate in a counter-clockwise and clockwise direction, as viewed in FIG. 1, by coiled spring members 6a and 6b, respectively, so that hook portions 7a and 7b formed on the respective ends of reel lock levers 4a and 4b are lockingly engaged with the peripheries of reel flanges 8a and 8b of reels 2a and 2b in toothed notches 9a and 9b, respectively, formed on the peripheries 8a and 8b of the reels. Thus, with lock levers 4a and 4b engaged in notches 9a and 9b, lock levers 4a and 4b preclude reels 2a and 2b from rotating in the tape unwinding directions, shown by solid arrows a and b, respectively, in FIG. 1.

However, when reels 2a and 2b are rotated in the tape winding directions, shown by broken line arrows a' and b', the reel lock levers 4a and 4b are rotated in the clockwise direction and counter-clockwise direction, as shown in FIG. 1, by a camming action against springs 6a and 6b so as to get over the teeth 9a and 9b on reel flanges 8a and 8b. Thus, the reels 2a and 2b can be rotated in the tape winding directions, if the tape is loosened.

The cassette also includes an L-shaped lock release lever 10 pivotally supported on a support pin 11 within area 3 so as to be rotatable thereon. When the tape cassette is loaded into operative position on the chassis of the VTR or tape recorder, a lock release pin 12 associated with the recorder is inserted through an opening 14 formed in the lower wall 13 of the cassette housing 1, as shown in broken line in FIG. 2. Upon insertion of lock release pin 12, a first leg 10a of lock release lever 10 is pushed upwardly from the position shown in solid line in FIG. 2 to the position shown in broken line. Accordingly, lock release lever 10 is rotated in the counter-clockwise direction, as viewed in FIG. 2, and leg 10b of lock release lever 10 contacts leg extensions 15a and 15b, respectively, of reel lock levers 4a and 4b. The lock levers 4a and 4b are rotated about their supports 5a and 5b and against the springs 6a and 6b in the clockwise and the counter-clockwise direction, respectively, as viewed in FIG. 1 from the position indicated in solid line to the positions indicated in broken line. Thus reel lock levers 4a and 4b are disengaged from teeth 9a and 9b on reel flanges 8a and 8b to release reels 2a and 2b so that the reels may rotate freely.

Reference is now made to FIGS. 3 to 9, for a description of the locking lever assembly of the present invention where elements in these embodiments which correspond to like elements in the conventional tape cassette shown in FIGS. 1 and 2 are denoted by the same reference numerals.

Figure 3:
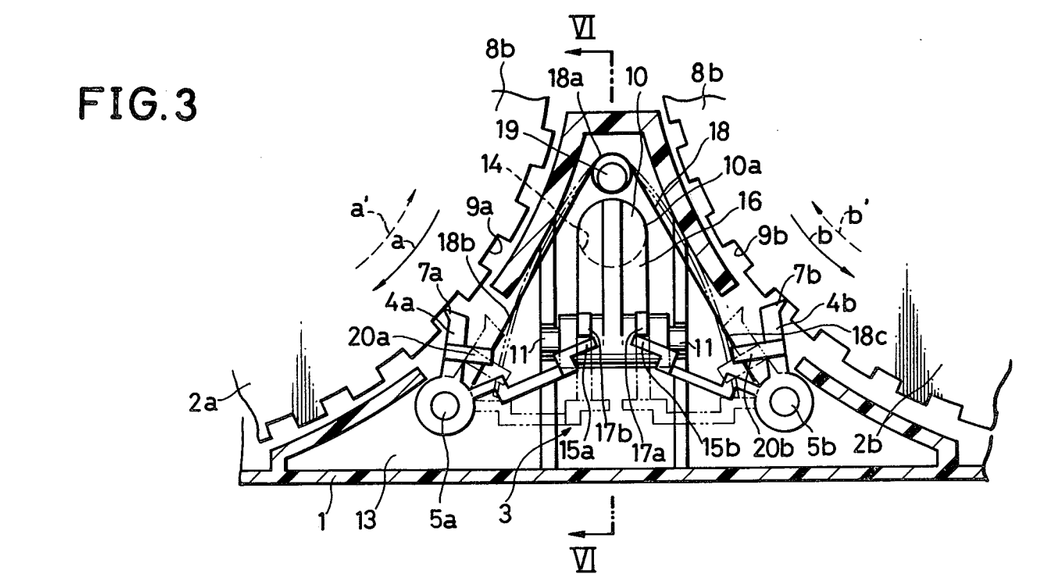
FIG. 3 is a partial sectional plan view of the tape cassette according to a first embodiment of this invention showing details of the reel locking mechanism.
Figure 4:
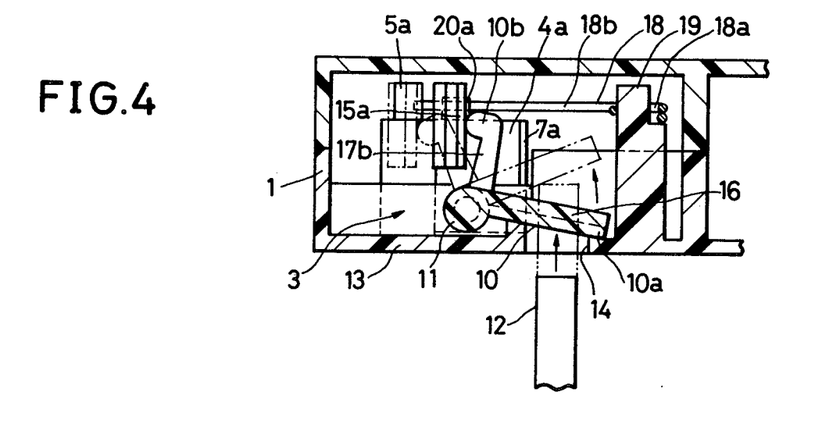
FIG. 4 is a cross-sectional view taken along line IV—IV on FIG. 3.
Figure 5:
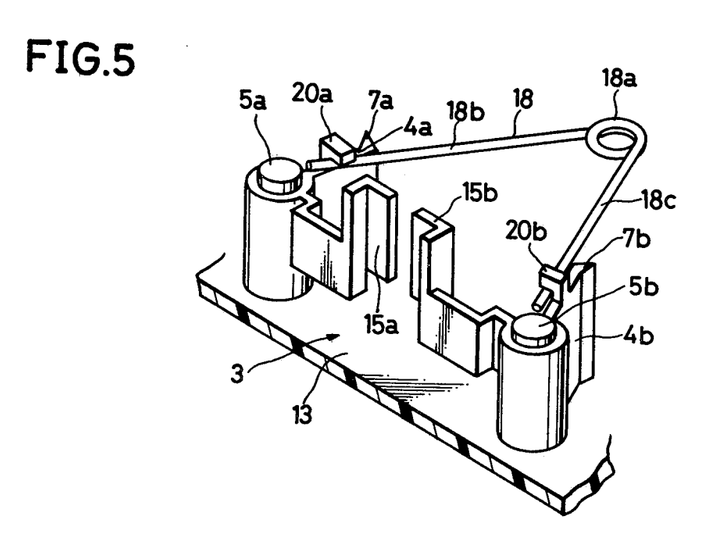
FIG. 5 is a perspective view of the single spring member used to urge locking engagement of the tape reels of the tape cassette of FIG. 3.

According to a first embodiment of the invention shown in FIGS. 3 to 5, a single V-shaped torsion spring 18 is used for urging the pair of the reel lock levers 4a and 4b into locking engagement within teeth 9a and 9b on the peripheries of reels 2a and 2b.

A wound portion 18a is formed in the center of V-shaped torsion spring 18 and is disposed about a support pin 19 integrally formed within the cassette housing in area 3. Both end portions 18b and 18c of torsion spring 18 are engaged with extending stop portions 20a and 20b formed integrally with reel lock levers 4a and 4b and reel lock levers 4a and 4b are urged in the counter-clockwise and clockwise directions, respectively, as viewed in FIG. 3 by the spring action of the end portions 18b and 18c, respectively, of the V-shaped torsion spring 18.

Figure 6:
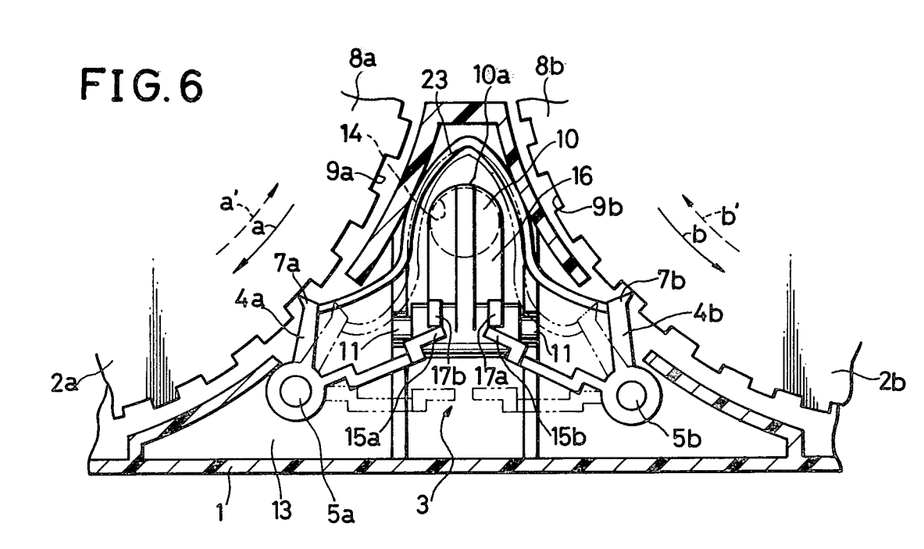
FIG. 6 is a partial sectional plan view similar to FIG. 3 showing a second embodiment of this invention.
Figure 7:
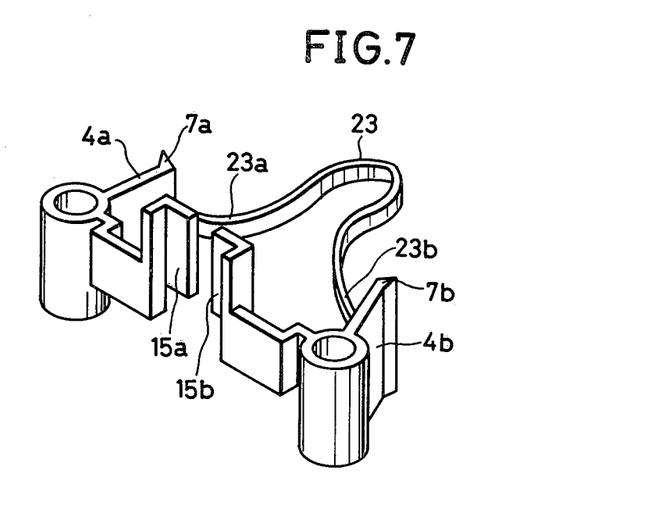
FIG. 7 is a perspective view of the single spring member of the tape cassette of FIG. 6.

Reference is now made to FIGS. 6 and 7 which illustrate a second embodiment of the present invention. According to this embodiment, the reel lock levers 4a and 4b are formed of a synthetic resin material and a single intermediate V-shaped spring portion 23 is integrally formed of the same synthetic resin. Thus, the reel lock levers 4a and 4b and the intermediate spring portion 23 connected at both its ends 23a and 23b with the reel lock levers 4a and 4b are formed in a single molding operation.

The synthetic resin material used in the V-shaped spring portion 23 exhibits an inherent elasticity which normally urges the locking levers 4a and 4b to move outwardly from each other. Thus, normally, the spring portion 23 is in the extended condition as shown by solid line in FIG. 6, so that the reel lock levers 4a and 4b are urged outwardly into locking engagement with the peripheries of the reels 2a and 2b. When the reel lock levers 4a and 4b are respectively rotated in the clockwise and counter-clockwise direction to the position shown in broken lines in FIG. 6, the V-shaped intermediate spring portion 23 is put into its contracted condition against its inherent elasticity to release the reels 2a and 2b for free rotation.

Figure 8:
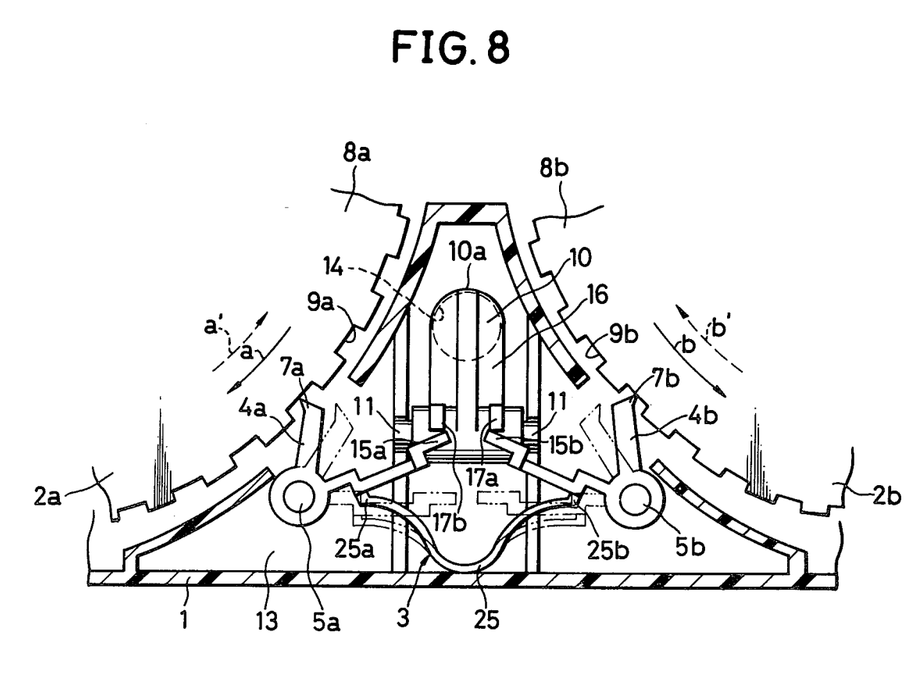
FIG. 8 is a partial sectional plan view similar to FIGS. 3 and 6 showing a third embodiment of this invention.
Figure 9:
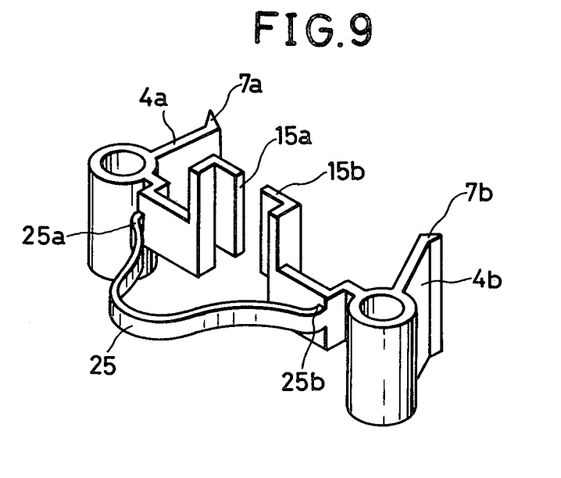
FIG. 9 is a perspective view of the single spring member of the tape cassette of FIG. 8.

A third embodiment of the present invention is shown in FIGS. 8 and 9. In this embodiment, the spring portion is a substantially V-shaped spring portion 25 formed integrally with the reel lock levers 4a and 4b. As in the embodiment of FIGS. 6 and 7 the reel lock levers 4a and 4b are integrally molded of a synthetic resin material having characteristics of inherent elasticity. Both ends 25a and 25b of the spring portion 25 are integrally connected with the extending portions 15a and 15b of reel lock levers 4a and 4b.

In this embodiment of the present invention, the V-shaped spring portion 25 is normally in an inwardly contracted condition as shown in solid line on FIG. 8 so that the reel lock levers 4a and 4b are urged into locking engagement with reels 2a and 2b. When the reel lock levers 4a and 4b are respectively rotated in the clockwise and counter-clockwise direction to the position shown in broken lines in FIG. 8 by the lock release lever 10, the spring portion 25 is put into its extended condition as shown in broken lines in FIG. 8 against its inherent elasticity to release the reels 2a and 2b for free rotation.

Thus, it is seen that the present invention utilizes a single spring to urge locking levers into locking engagement with a pair of cassette reels. The spring portion may be formed integrally with the reel lock levers 4a and 4b of a synthetic material as shown in FIGS. 7 and 9 or can be connected to the separate locking levers prior to assembly as shown in FIG. 5. When the single spring is formed integrally with the reel lock levers 4a and 4b, four parts of the conventional tape cassette, namely the two reel lock levers 4a and 4b, and the two torsion springs 6a and 6b can be formed as one body. Accordingly, the number of individual parts are significantly reduced.

Further, since the necessary parts are formed of synthetic resin by one forming operation, the manufacture of the tape cassette is simplified. Since the necessary parts are formed as one body, or assembled into one body prior to final assembly, the assembly of the cassette is greatly simplified as the spring locking lever assembly can be readily assembled as a single unit. This is in marked contrast to the difficulty of assembly of a tape cassette as shown in FIGS. 1 and 2 where the four parts, which are quite small and difficult to handle, must be individually assembled into the tape cassette. Thus, the present invention affords a much simpler assembly procedure which can be readily automated.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined in the appended claims.

What is claimed is:

1. A tape cassette for use in a magnetic recording and reproducing apparatus comprising a housing including a bottom wall, first and second tape reel members rotatably mounted in said housing, said first and second reel members being mounted in said housing a predetermined distance apart defining an access space therebetween, each said reel member including a flanged portion having a toothed peripheral extent, a first reel locking member pivotally mounted on said bottom wall within said access space adjacent the toothed peripheral extent of said first reel member, a second reel locking member pivotally mounted on said bottom wall within said access space adjacent the toothed peripheral extent of said second reel member, each said reel locking member being pivotable from a first position wherein an end portion thereof is adapted to lockingly engage the toothed peripheral extent of a respective reel member to a second position wherein said end portion is disengaged from the toothed peripheral extent of a respective reel member, a signal wound torsion spring disposed within said access space and interconnecting said first and second reel locking members, said spring having a first leg connected with a portion of said first reel locking member to normally urge the latter into its said first position in locking engagement with the toothed peripheral extent of said first reel member and a second leg connected with a portion of said second reel locking member to urge the latter into its said first position in locking engagement with the toothed peripheral extent of said second reel member, and control lever means pivotably mounted in said housing and being pivotable from a first position spaced from said reel locking members to a second position in contact with a portion of each said reel locking member whereby, when said control lever means moves from its said first position to its said second position, each said reel locking member moves from its respective first position to its respective second position thereby releasing said first and second reel members so they are free to rotate.

2. A tape cassette according to claim 1 wherein said single wound torsion spring is V-shaped.

3. A tape cassette for use in a magnetic recording and reproducing apparatus comprising a housing including a bottom wall, first and second tape reel members rotatably mounted in said housing, said first and second reel members being mounted in said housing a predetermined distance apart defining an access space therebetween, each said reel member including a flanged portion having a toothed peripheral extent, a first reel locking member pivotally mounted on said bottom wall within said access space adjacent the toothed peripheral extent of said first reel member, a second reel locking member pivotally mounted on said bottom wall within said access space adjacent the toothed peripheral extent of said second reel member, each said reel locking member being pivotable from a first position wherein an end portion thereof is adapted to lockingly engage the toothed peripheral extent of a respective reel member to a second position wherein said end portion is disengaged from the toothed peripheral extent of a respective reel member, a single spring biasing member molded of a synthetic resin as an integral unit with said first and second reel locking members and having inherent elastic properties to impart spring bias to said spring biasing member, said spring biasing member being disposed within said access space and interconnecting said first and second reel locking members to normally urge said first reel locking member into its said first position in locking engagement with the toothed peripheral extent of said first reel member and said second reel locking member into its said first position in locking engagement with the toothed peripheral extent of said second reel member, and control lever means pivotably mounted in said housing and being pivotable from a first position in contact with a portion of each said reel locking member whereby, when said control lever means moves from its said first position to its said second position, each said reel locking member moves from its respective first position to its respective second position thereby releasing said first and second reel members so they are free to rotate.

4. A tape cassette according to claim 3 wherein said single spring biasing member is V-shaped.

5. A tape cassette according to claim 1; wherein said single wound torsion spring is effective to urge each of said first and second reel locking members toward its said first position independently of the urging of the other of said reel locking members.

6. A tape cassette according to claim 5; wherein said single wound torsion spring is V-shaped.

7. A tape cassette according to claim 3; wherein said single spring biasing member is effective to urge each of said first and second reel locking members towards its said first position independently of the urging of the other of said reel locking members.

8. A tape cassette according to claim 7; wherein said single spring biasing member is V-shaped.

* * * * *